United States Patent [19]

Shannon et al.

[11] Patent Number: 4,777,763
[45] Date of Patent: Oct. 18, 1988

[54] PLANT GROWING MEDIUM

[75] Inventors: Richard F. Shannon, Lancaster; G. Fred Willard, Newark, both of Ohio

[73] Assignee: Owens-Corning Fiberglas Corporation, Toledo, Ohio

[21] Appl. No.: 875,141

[22] Filed: Jun. 17, 1986

[51] Int. Cl.[4] .................. A01G 31/00; C10L 5/40
[52] U.S. Cl. ............................... 47/74; 47/64; 47/87; 71/25
[58] Field of Search .................. 47/59, 62–65, 47/9, 86–87, 74; 71/25

[56] References Cited

U.S. PATENT DOCUMENTS

| | | | |
|---|---|---|---|
| 2,192,939 | 3/1940 | Slayter et al. | 47/9 X |
| 2,728,939 | 1/1956 | Behr . | |
| 2,785,969 | 3/1957 | Clawson | 47/66 X |
| 2,949,698 | 8/1960 | Downey et al. | 47/9 |
| 3,365,840 | 1/1968 | Cooper | 47/59 X |
| 3,513,593 | 5/1970 | Beck | 47/87 |
| 3,524,279 | 8/1970 | Adams | 47/87 |
| 4,034,506 | 7/1977 | Kasahara et al. | 47/64 |
| 4,058,931 | 11/1977 | Vestergaard | 47/87 |
| 4,296,169 | 10/1981 | Shannon . | |
| 4,364,883 | 12/1982 | Shannon . | |
| 4,369,054 | 1/1983 | Shinholster et al. | 47/74 X |

FOREIGN PATENT DOCUMENTS

2341263  2/1976  France .................. 47/64

*Primary Examiner*—Robert E. Bagwill
*Attorney, Agent, or Firm*—Ted C. Gillespie; Paul J. Rose

[57] ABSTRACT

A plant growing medium has a fabricated fibrous product having a density below 4.5 pcf, and preferably below 3.0 pcf, as a root supporting structure. The product comprises a pack of fibers, the fibers having a three-dimensional orientation and at least some of the fibers being glass fibers, and binder binding the fibers to each other at substantially every place of fiber-to-fiber contact.

1 Claim, 13 Drawing Sheets

PLANT GROWING MEDIUM

TECHNICAL FIELD

This invention relates generally to plant growing media, and more particularly to a plant growing medium having a fabricated fibrous board, preferably of glass fibers, with a three-dimensional orientation of fibers, and binder binding the fibers to each other at substantially every place of fiber-to-fiber contact, as the basic structure. The structure enables transplanting of individual seedlings from a greenhouse to an agricultural field by an automatic planting machine with less criticality as to the stage of development of the root systems of the seedlings at the time of transplanting.

BACKGROUND ART

Wet-laid boards normally have a substantially two-dimensional orientation of fibers. For example, U.S. Pat. No. 1,969,156, issued to C. H. Schuttler on Aug. 7, 1934, discloses a batch-type process wherein a fibrous slurry is placed in "settling cans". The passage in column 2, lines 33–53, discusses "the stratified formation of the fibers" and "the horizontal disposition of the fibrous material". As another example, U.S. Pat. No. 2,633,433, issued to F. H. Hollenberg, Jr. on Mar. 31, 1953, discloses a continuous process using a revolving screen or Fourdrinier machine. The passage in column 7, lines 2–8, points out that "in water-laid webs, the major portion of the fibers therein are oriented in a plane substantially parallel to the plane of the web or sheet".

Rock wool growing slabs and blocks are marketed by Grodania A/S of Denmark under the trademark "Grodan". Rock wool and slag wool are generally laminar, or mostly two-dimensional in orientation of fibers.

DISCLOSURE OF INVENTION

In accordance with the invention, an apparatus and a process are disclosed wherein wet-laid fibrous boards having a three-dimensional orientation of fibers are produced. Such boards should have a density of less than 4.5, and preferably less than 3.0, pounds per cubic foot, for use as plant growing media. However, for glass fiber boards with densities of about fifteen pounds per cubic foot (15 pcf) or less, the boards so produced have higher compressive and flexural strengths than conventional boards of the same density and binder content formed directly from spun fibers sprayed with thermosetting resin as a binder and also than boards formed by heat-cleaning conventional glass wool, impregnating it with the same binder to the same binder content, and molding it to the same density.

Whe low-density glass fiber boards (less than about three pcf) constructed in accordance with the invention are used as plant growing media, the three-dimensional orientation of fibers and the binding at substantially every place of fiber-to-fiber contact results in a structure which does not readily pull apart or delaminate, as do rock wool and slag wool, and therefore does not require a fully developed root system for seedlings, i.e., throughout a planting cube or pod, before transplanting can take place, as do rock wool and slag wool.

BRIEF DESCRIPTION OF DRAWINGS

The invention is explained more fully hereinafter, reference being had to the accompanying drawings wherein.

BEST MODE OF CARRYING OUT THE INVENTION

Plant growing media constructed in accordance with the invention should have a density of less than 4.5, and preferably less than 3.0, pounds per cubic foot. However, FIGS. 1–10, relating mainly to test samples with higher densities, are included and discussed herein for better understanding of the superiority of the material. For the "lofted" test samples of FIGS. 1–8, glass wool was heat-cleaned in an oven at about 850° F. for about two hours to remove the binder. Pieces of the heat-cleaned glass wool were added to water in a hydropulper and the hydropulper was run for about half a minute to separate and disperse the glass wool fibers. The resultant slurry was poured into a deckle box having a closed drain, having water in the bottom up to the level of the screen, and having a forming area fourteen inches square. The slurry in the deckle box was lightly stirred to effect generally equal distribution of the fibers, and then allowed to stand for about half a minute while the fibers settled on the screen. The drain was then opened to let the water drain out by gravity. The resulting wet, fluffy or lofted mat of entangled fibers, about three inches thick, depending on the amount of glass added to the water, was tipped onto a portable screen after the sides of the deckle box were removed, placed on a suction machine to remove more water, immersed in a pan containing a dilute solution of a thermosetting resin binder such as urea-phenol-formaldehyde, drained by gravity, and placed back on the suction machine to remove more resin solution. The impregnated lofted mat was then pressed to a desired thickness and the resin cured in a platen press heated to ·365° F. The entire process was repeated three more times with the impregnated lofted mat being pressed to different thicknesses and the resin cured to produce "lofted" glass fiber boards of four different densities.

For comparison, "non-lofted" boards were produced in the same our thicknesses, from both "as-produced"

glass wool and heat-cleaned glass wool. Conventionally formed glass wool was heat-cleaned, cut into fourteen-inch square batts, immersed in the pan containing the dilute solution of resin, drained by gravity and then by suction, and molded in the platen press to the four thicknesses. "As-produced" conventionally formed glass wool with a high amount of uncured binder (about 24% LOI after curing) was merely cut into fourteen-inch square batts and press-molded to the four different thicknesses. The thicknesses, densities, and binder contents (loss on ignition) of the glass fiber boards were as follows:

|  | Thickness (Inches) | Density (pcf) | Binder Content (% LOI) |
|---|---|---|---|
| 1. Heat Cleaned, Lofted | 1 | 4.6 | 11.9 |
|  | 3/4 | 6.0 | 12.9 |
|  | 1/2 | 9.3 | 12.0 |
|  | 1/4 | 17.7 | 13.2 |
| 2. Heat Cleaned, Non-Lofted | 1 | 4.9 | 12.0 |
|  | 3/4 | 6.4 | 12.9 |
|  | 1/2 | 9.6 | 11.7 |
|  | 1/4 | 17.6 | 12.7 |
| 3. As Produced, Non-Lofted | 1 | 4.8 | 23.5 |
|  | 3/4 | 6.2 | 25.4 |
|  | 1/2 | 9.2 | 24.1 |
|  | 1/4 | 18.9 | 23.9 |

The boards were cut into six-inch square test specimens for determining compressive strength and into six-inch by twelve-inch test specimens for determining flexural strength based on a ten-inch span. The test results are shown in the graphs of FIGS. 1-8, each curve being based on the average of five test specimens.

Figure 1:
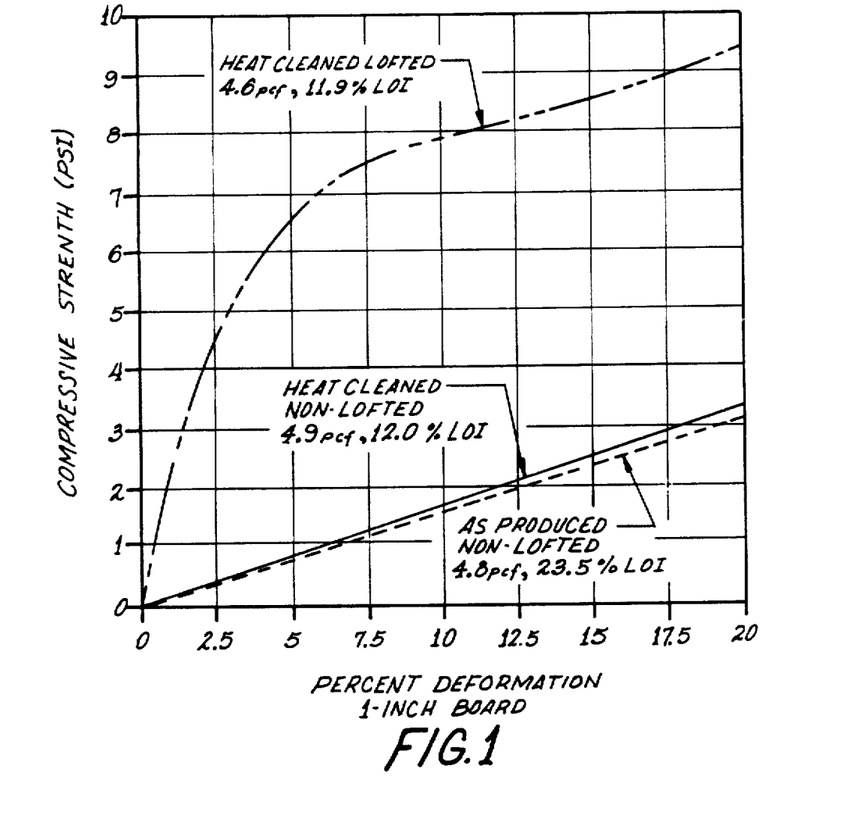
FIGS. 1–4 are graphs of compressive strength, comparing wet-laid glass fiber boards made in accordance with the invention with other glass fiber boards, respectively for four different densities and thicknesses.
Figure 2:
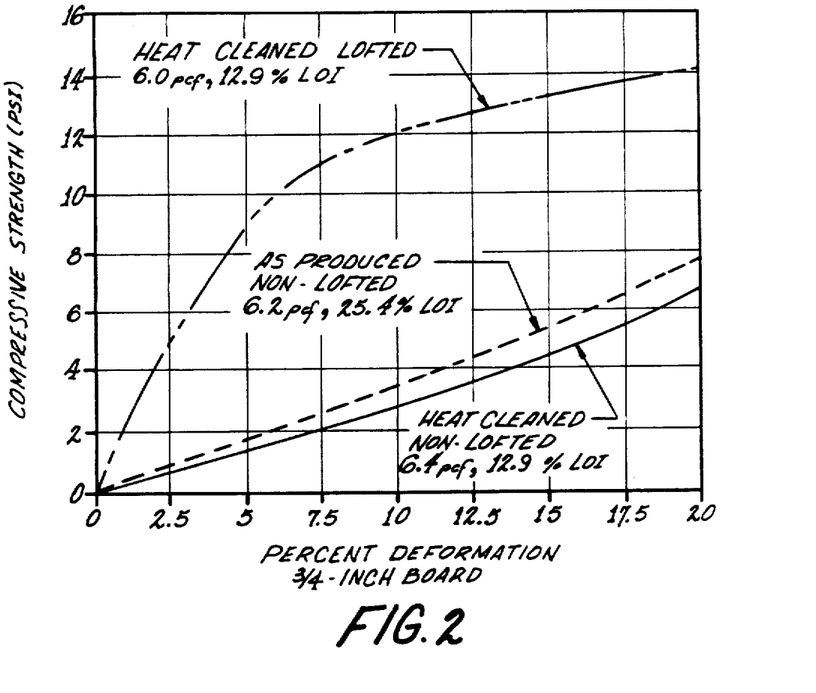
Figure 3:
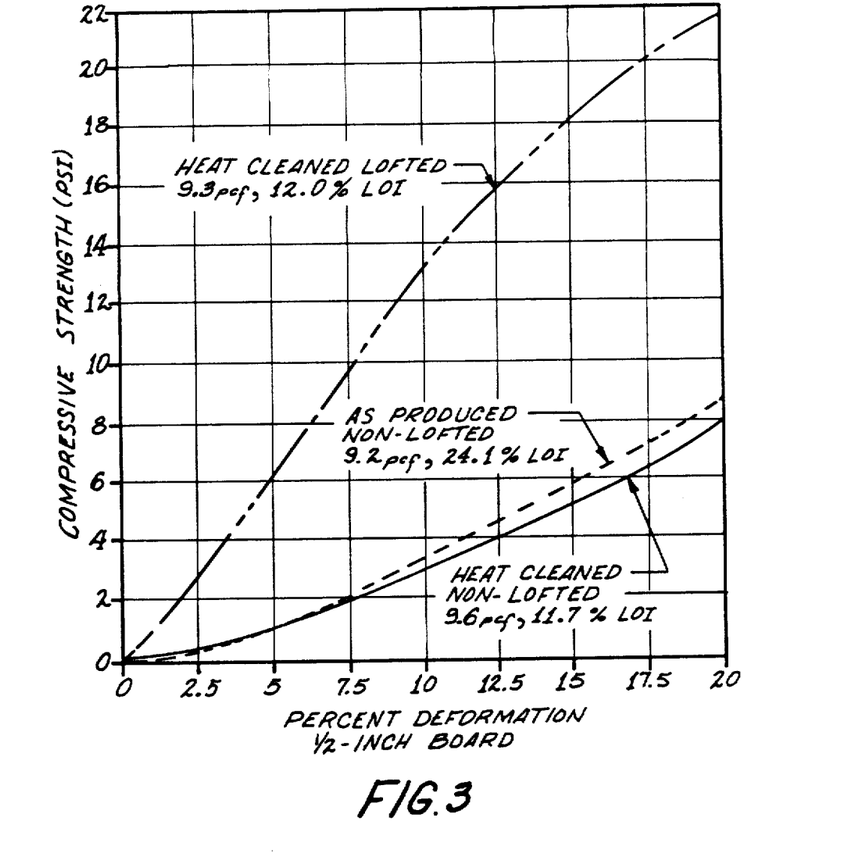
Figure 4:
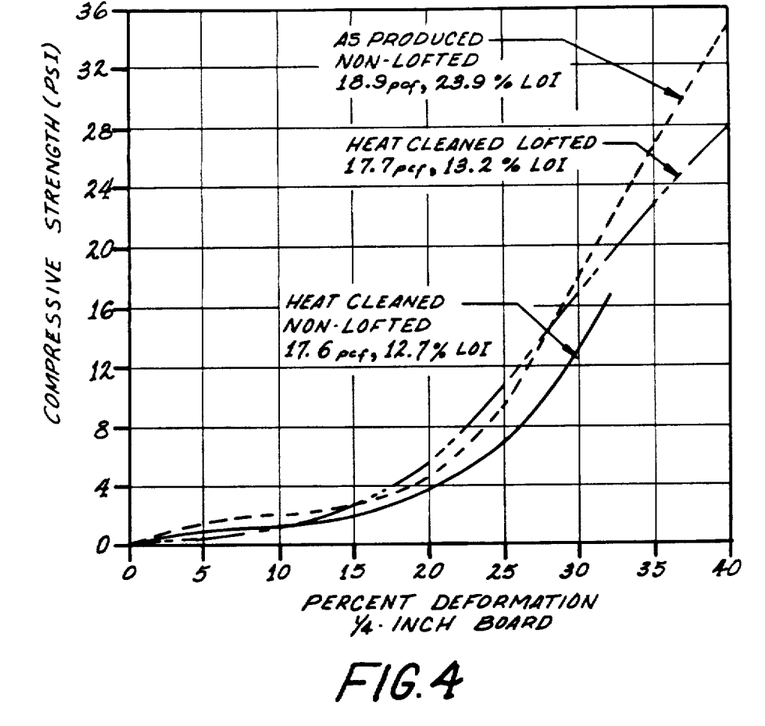

FIGS. 1-3 show that for densities of about 4.7, 6.2, and 9.3 pounds per cubic foot, the lofted glass fiber boards made in accordance with the invention have much higher compressive strengths than the non-lofted boards, while FIG. 4 shows that for a density of about 18 pcf, the compressive strengths of the three boards are about the same, considering the large differences of FIGS. 1-3.

Figure 5:
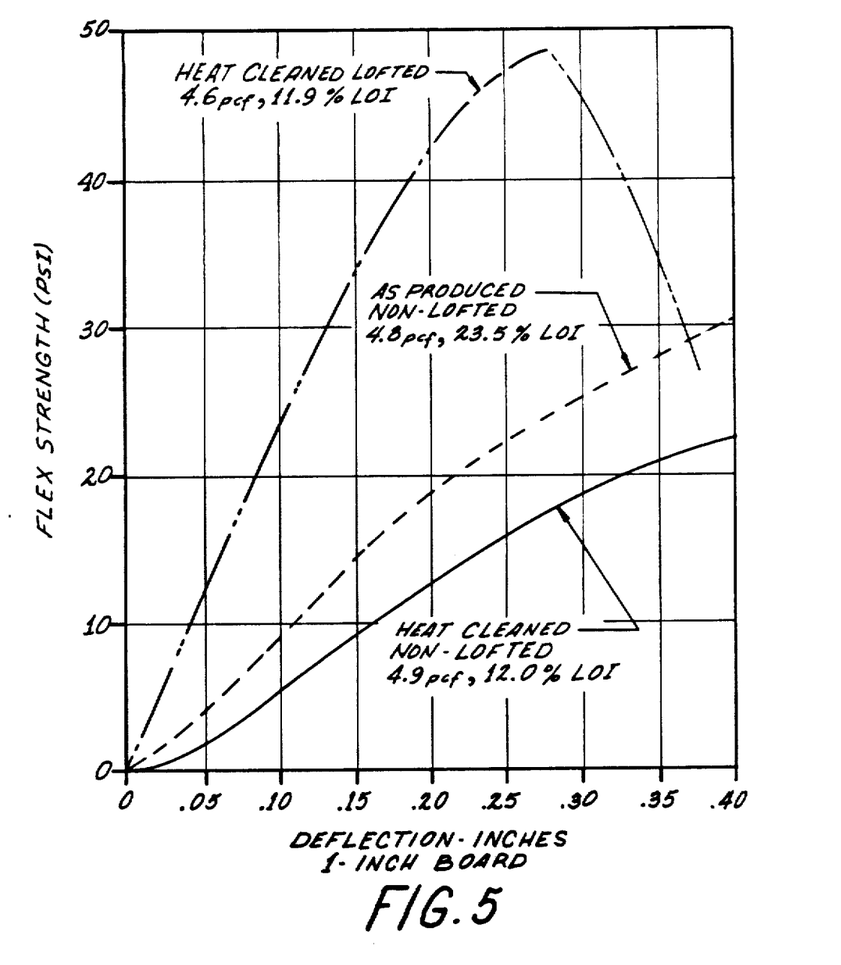
FIGS. 5–8 are graphs of flexural strength, comparing wet-laid glass fiber boards made in accordance with the invention with other glass fiber boards, respectively for four different densities and thicknesses.
Figure 6:
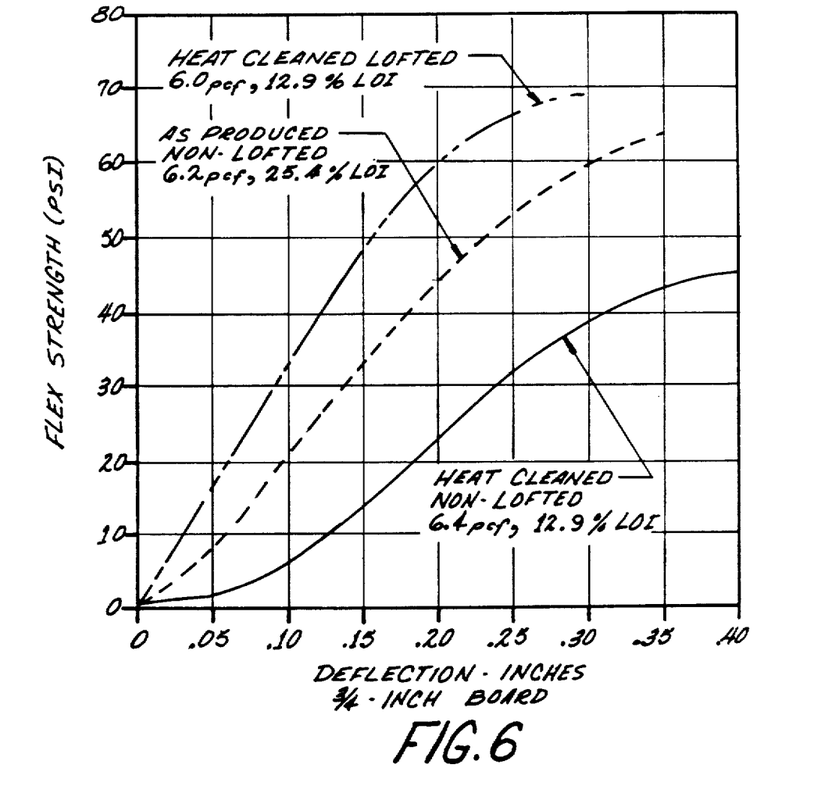

FIGS. 5 and 6 show that for densities of about 4.7 and 6.2 pcf, the lofted glass fiber boards made in accordance with the invention have much higher flexural strengths than either of the non-lofted boards, although the flexural strength for the lofted board of FIG. 5 dropped off after a deflection of about 0.28 inches.

Figure 7:
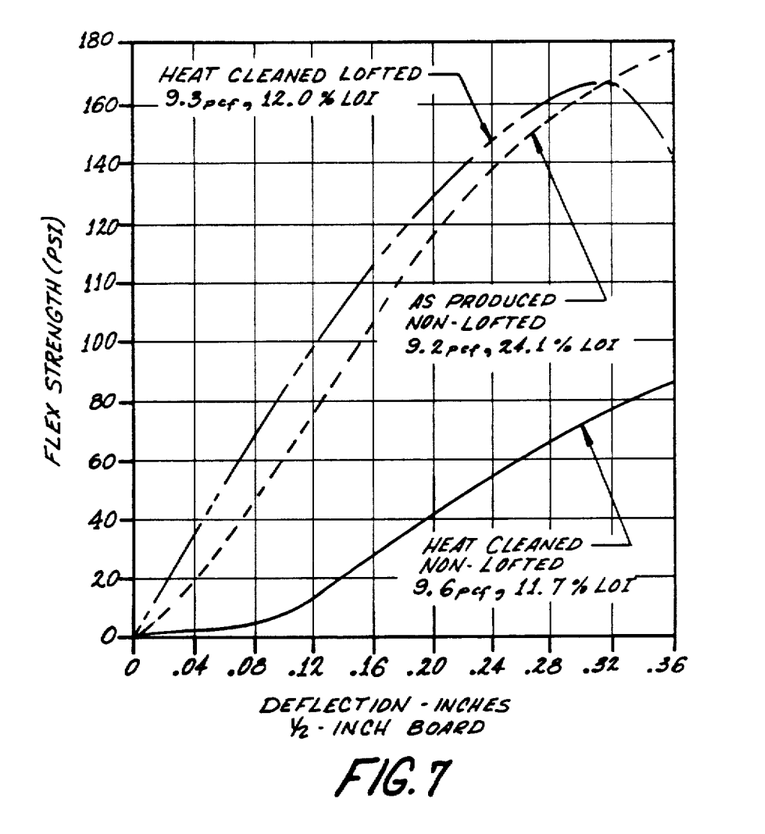

FIG. 7 shows that for a density of about 9.3 pcf, the lofted glass fiber board made in accordance with the invention has a much higher flexural strength than the heat-cleaned non-lofted board, but only slightly higher flexural strength than the as-produced non-lofted board with its higher binder content.

Figure 8:
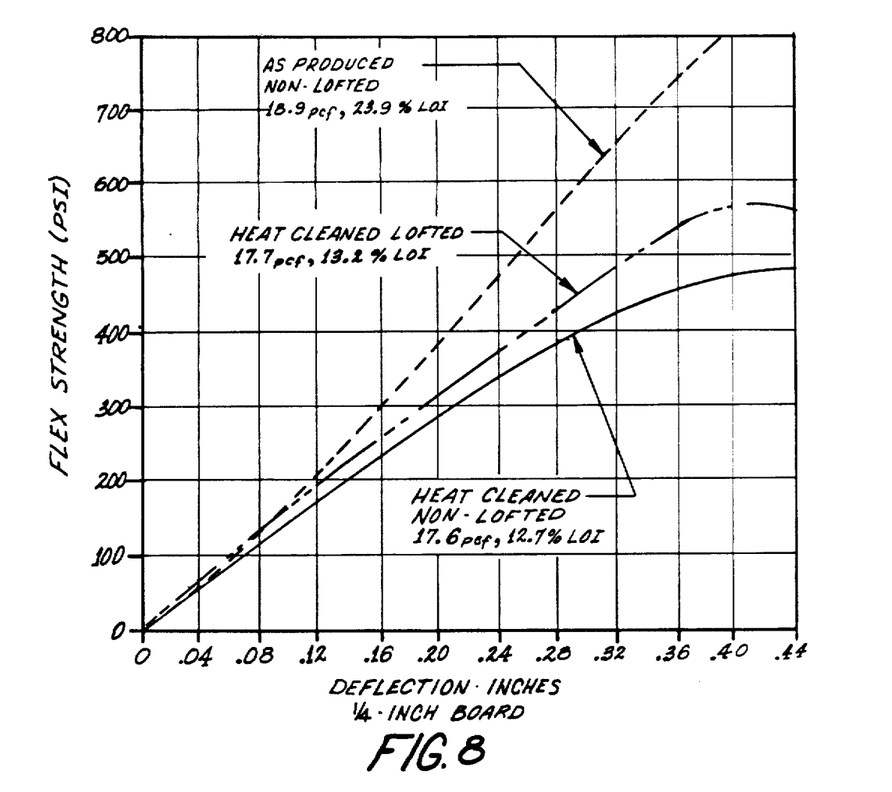

FIG. 8 shows that for a density of about 18 pcf, there is not much difference in flexural strength between the heat-cleaned lofted board and the non-lofted boards.

The overall conclusion that can be drawn from FIGS. 1-8 is that in the lofted boards, there is a three-dimensional orientation of the glass fibers and this is flattened toward a two-dimensional orientation as the thickness is decreased and density increased. For boards of the same binder content, the advantage of the lofted board over the non-lofted board with respect to compressive strength and flexural strength generally disappears at a density of about 18 pcf. However, due to bonding at substantially every fiber-to-fiber point of contact in the lofted board and possibly a residuum of some three-dimensional orientation of the fibers, lofted boards have been shown to have much greater shear strength than non-lofted boards, even at densities as high as 27 pcf.

Figure 9:
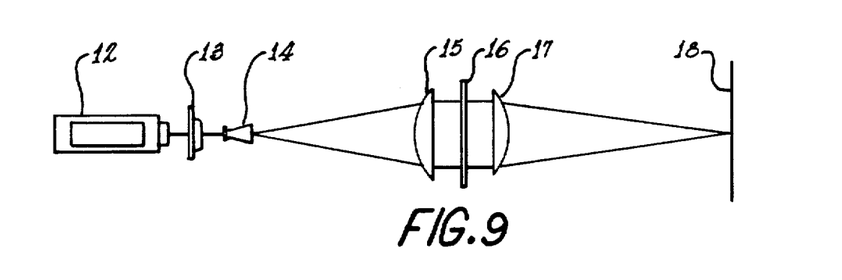
FIG. 9 is a schematic diagram of diffraction testing apparatus used to analyze orientation of fibers.

FIG. 9 shows a schematic diagram of diffraction apparatus which can be used to determine orientation of fibers. The apparatus includes a helium-neon laser 12, a shutter 13, a ten-power microscope 14 as an objective lens, a first converging lens 15, a test specimen holder 16, a second converging lens 17, and a photographic film holder 18. The shape of the diffraction pattern of a test specimen is a direct indication of the state of the orientation of fibers in the specimen. A specimen with perfectly random three-dimensional orientation of fibers would produce a circle as a diffraction pattern. A laminar structure with fibers mostly in parallel planes will produce a highly elongated ellipse as a diffraction pattern. The ratio of the major axis to the minor axis of an elliptical diffraction pattern gives an indication of the state of fiber orientation. The higher this ratio is, the more laminar is the structure.

Thin slices having a thickness of about 0.1 inch were cut, from eight boards of different densities made in accordance with the invention, perpendicularly to major surfaces of the boards. The thin slices were mounted in black frames for ease in handling and tested in the diffraction apparatus. Elliptical patterns formed on the photographic film were measured, with the following results for the boards made from lofted, heat-cleaned glass wool:

| Sample | Density (lb./cu. ft.) | Ratio, Major To Minor Axis |
|---|---|---|
| 1 | 2.6 | 1.33 |
| 2 | 3.4 | 1.45 |
| 3 | 4.0 | 1.50 |
| 4 | 4.5 | 1.60 |
| 5 | 6.3 | 2.00 |
| 6 | 7.4 | 2.20 |
| 7 | 8.8 | 2.75 |
| 8 | 11.5 | 2.83 |

The diffraction test results confirm that in low-density boards made in accordance with the invention, there is a three-dimensional orientation of fibers, and that as density increases due to increased compression in successive boards during forming, the three-dimensional orientation of fibers is flattened toward a two-dimensional orientation of fibers.

Figure 10:
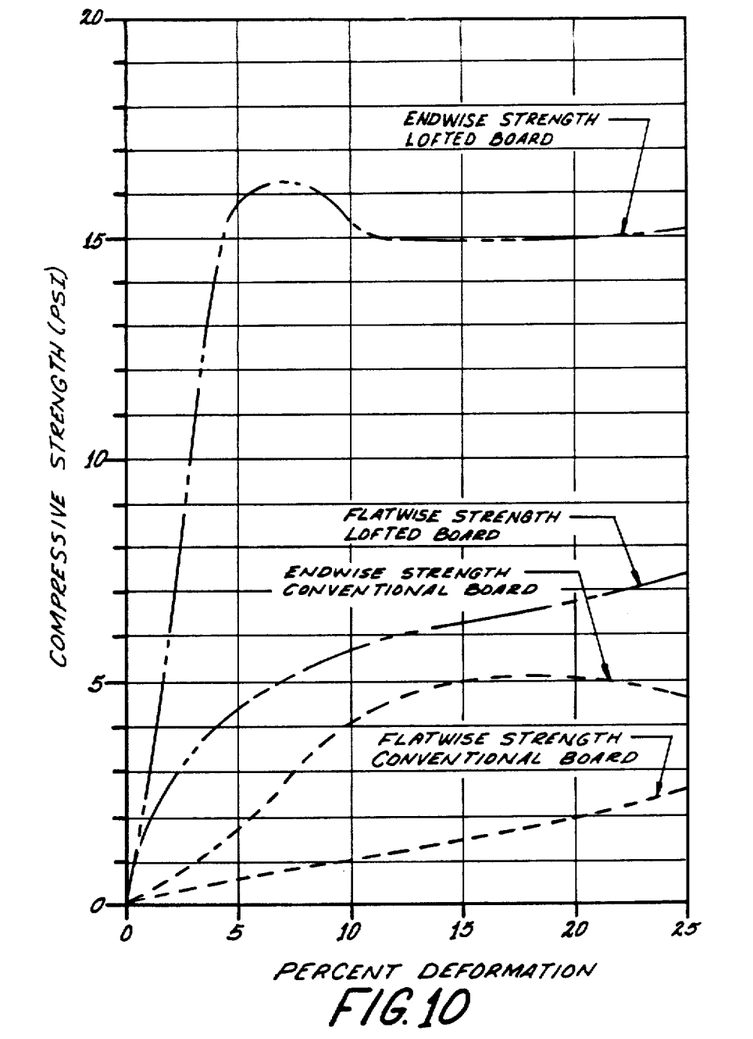
FIG. 10 is a graph of compressive strength comparing a wet-laid board made in accordance with the invention with a conventional board for both endwise and flatwise compression.

FIG. 10 is a graph of endwise and flatwise compressive strength tests for a lofted board constructed in accordance with the invention and a conventionally formed board.

For the conventional board in FIG. 10, a standard commercially available glass fiber board sold as an acoustical ceiling panel was selected. The facing was removed. The board had a thickness of 1-5/16 inches, a density of 3.5 lb. per cu. ft., and a binder content (loss on ignition) of 10.7%. Six-inch square test specimens were cut for flatwise compressive strength testing. For endwise compressive strength testing, test specimens were made by slitting the board into strips 1-5/16 inches wide. The strips were cut into six-inch lengths and rotated ninety degrees about their longitudinal axes from their original position in the board. Each test specimen was then formed by butting four of the so rotated strips against each other to form test specimens 5¼ inches by 6 inches.

A lofted glass fiber board was prepared from heat-cleaned glass wool in accordance with the invention for comparison with the conventional board in FIG. 10. After the separating and dispersing of the fibers in water in the hydropulper, draining, drying, and reresinating, the lofted fibers were hot-press-molded to a thickness of 1-5/16 and a density of 3.5±0.1 lb. per cu. ft. The binder content turned out to be 12.5% (loss on ignition). Test specimens were prepared similarly to the method described above for the conventional board. Compressive strength tests were run on all specimens up to 25% deformation.

With reference to FIG. 10, the endwise compressive strength for the conventional board was considerably higher than the flatwise compressive strength, as expected. Unexpectedly, however, the flatwise compressive strength for the lofted board was higher than the endwise compressive strength for the conventional board, and even more unexpectedly, the endwise compressive strength for the lofted board was about three times greater than the flatwise compressive strength of the lofted board. Further, at about 5% deformation, the endwise compressive strength for the lofted board was about 9 times as great as the endwise compressive strength of the conventional board, and about 24 times as great as the flatwise compressive strength of the conventional board.

Figure 11:
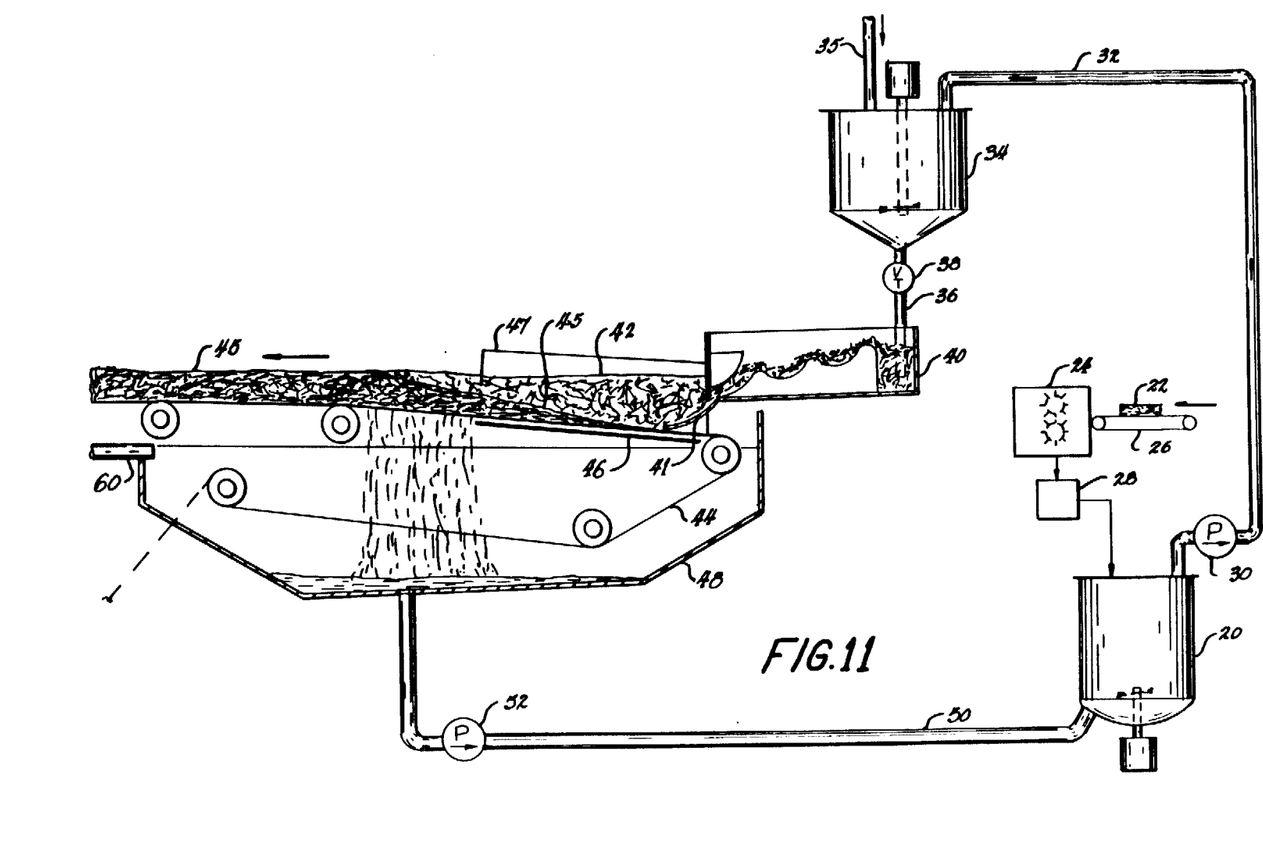
FIGS. 11–12 considered together are a schematic side elevational view of apparatus for carrying out the process of the invention.
Figure 12:
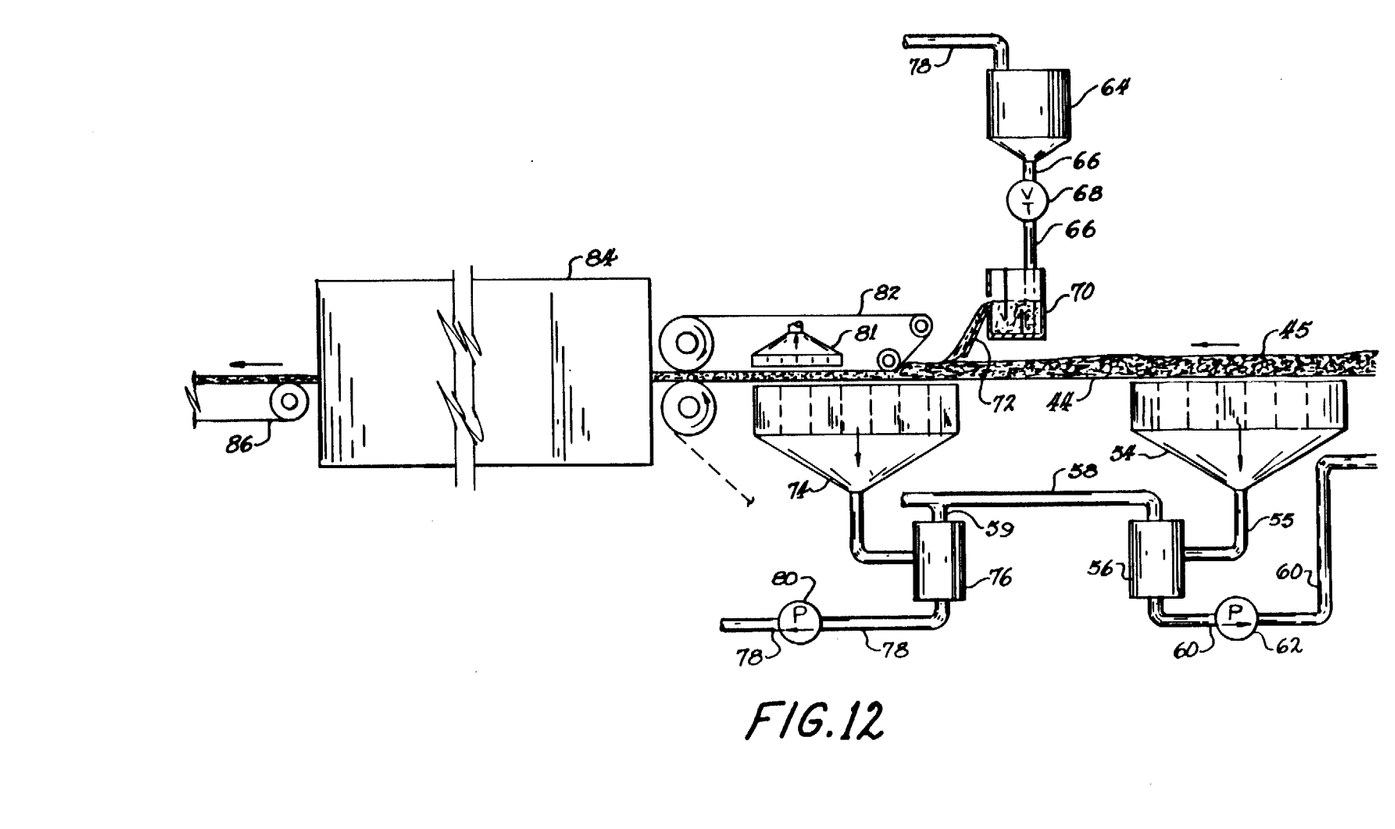

FIGS. 11 and 12 schematically show exemplary apparatus for making lofted boards, i.e., fibrous boards with three-dimensional orientation of fibers, by a continuous process. For plant growing media of the invention, such boards have a density of less than 4.5, and preferably less than 3.0, pcf. With reference to FIG. 11, a conventional hydropulper 20 is provided for separating and dispersing fibrous material, preferably glass wool, in water. Hot water (140° to 180° F.) is used if the glass wool includes a binder. If desired, for lower density end products a binder solution may be used rather than plain water. The glass wool may be fed to the hydropulper in any suitable manner providing a constant flow rate. In the example shown, glass wool batts 22 are fed to a conventional carder 24 on a conveyor 26. From the carder 24 smaller pieces of glass wool are fed to a conventional even-feeder 28 and then to the hydropulper 20.

From the hydropulper 20 a slurry of glass fibers in water or binder solution is pumped by a pump 30 through a conduit 32 to a stream-jacketed mixing tank 34, and flows by gravity through a conduit 36 having a throttling valve 38, and into a headbox 40.

The headbox 40 may be of any suitable design to discharge the slurry smoothly, with as little turbulence as possible, into a slurry pool 42 above a porous conveyor belt or chain 44 and distribute it evenly across the width of the belt. A barrier plate 46 is provided beneath an inclined portion of the belt 44. Side plates 47, only one of which is shown, engage opposite longitudinal edges of the belt 44 and are joined to the plate 46. A delivery chute portion 41 of the headbox 40 contacts the conveyor belt or chain 44 and acts as a dam preventing slurry from running down the inclined portion of the belt against its direction of travel. Therefore, above the barrier plate 46, the water or binder solution in the slurry pool 42 cannot escape through the porous belt or sideways thereof. A fiber pack 45 having a three-dimensional orientation of fibers gradually builds up on the belt 44 at the bottom of the slurry pool 42.

The length of the barrier plate 46 and the corresponding side plates 47 is determined by the intended speed of the belt 44. As an example, if the intended line speed of the manufactured product is twenty feet per minute, the plate 46 should be at least ten feet long to allow glass fibers to settle randomly on the belt 44 for a time period of about thirty seconds before draining of the water or binder solution from the pack 45 through the porous belt 44 takes place as the belt 44 with the pack 45 thereon passes the downstream edge of the plate 46. By the coordination of the length of the barrier plate 46 with the line speed, the continuous process can be made to duplicate the previously described batch-type process with respect to settling of the fibers into a three-dimensional fiber orientation for half a minute before drainage of the water or binder solution from the pack by gravity.

A tank 48 is provided beneath the upstream end of the porous belt 44 to catch the water or binder solution draining from the slurry after it passes the downstream edge of the barrier plate 46. A conduit 50 connected to the tank 48 at the bottom and provided with a pump 52 returns the drained water or binder solution to the hydropulper 20. Make-up water or binder solution is supplied to the mixing tank 34 through a conduit 35.

With the reference to FIG. 12, a suction chamber 54 is provided for extracting additional water or binder solution from the fiber pack 45 after it passes the downstream end of the tank 48. The suction chamber 54 is connected by a conduit 55 to a separator 56 and by a conduit 58 to a suction and exhaust fan (not shown). A conduit 60 having a pump 62 therein delivers water or binder solution from the separator 56 to the tank 48.

If water is used instead of binder solution in the hydropulper 20, mixing tank 34, and conduit 35, then binder solution is applied to the fiber pack 45 after it passes the suction chamber 54. For this purpose, a binder solution tank 64 is provided. Binder solution flows by gravity through a conduit 66 provided with a throttling valve 68 into a binder applicator 70, out through a side opening, and down an angularly disposed plate 72 onto the fiber pack 45. A suction chamber 74 is provided for extracting excess binder solution from the fiber pack. The suction chamber 74 is connected by a conduit 75 to a separator 76 and, by a connection 59 to the conduit 58, to the suction and exhaust fan (not shown). A conduit 78 having a pump 80 therein delivers recovered binder solution back to the tank 64.

Preferably another suction chamber 81 is provided above the fiber pack 45 to effect more even distribution of the binder solution which remains in the fiber pack. Without the upper suction chamber 81, there would likely be more binder solution at the bottom of the pack than at the top. It will be understood that the suction chamber 81 can be connected to the conduit 75 and thereby to the separator 76 and the suction and exhaust fan (not shown).

The fiber pack 45 is compacted to a desired thickness of board between the porous belt or chain 44 and an upper conveyor belt 82 suitably mounted and driven at the same speed as the belt or chain 44. Then the compacted pack is passed through a conventional oven 84 to cure the binder and carried away by a conveyor 86 to suitable conventional mechanism for cutting the resultant board into desired lengths. The lower path of the belt 44 is omitted for clarity.

Figure 13:
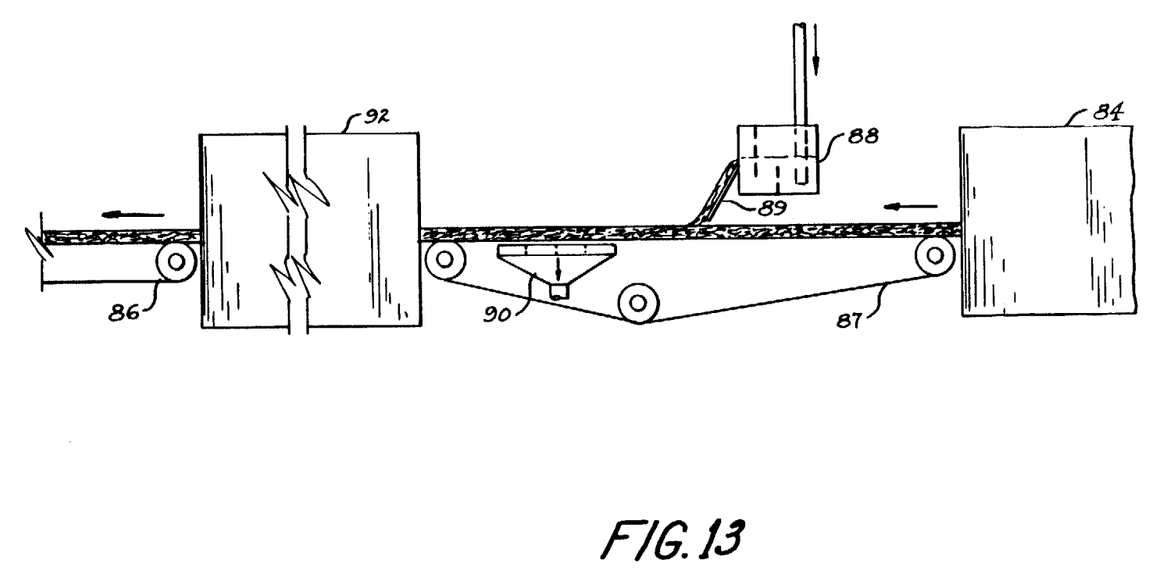
FIG. 13 is a schematic side elevational view of optional additional apparatus.

FIG. 13 shows optional additional apparatus used when it is desired to impregnate the board with an additional substance after the binder has been cured in the oven 84. The additional apparatus includes another conveyor 87, an applicator 88 having an inclined plate 89, and a suction chamber 90. Also shown is a second drying or curing oven 92 used if required by the impregnant. The applicator 88 illustrates only one method of impregnating. Impregnation could also be by injection under pressure or by foaming with the board confined between two plates.

Figures 14, 16:
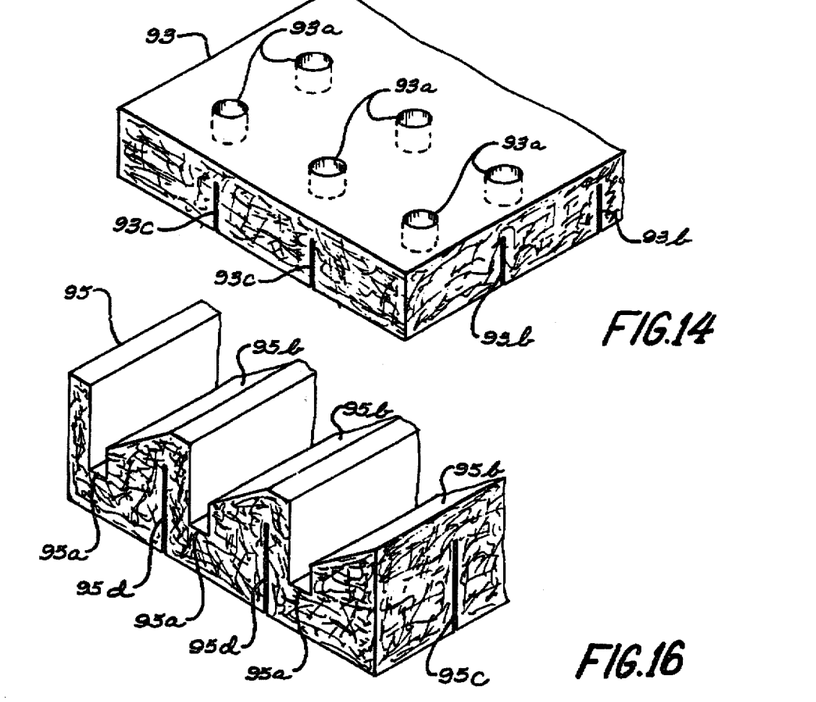
FIG. 14 is a schematic isometric view of a plant growing medium constructed in accordance with the invention and provided with holes for individual seeds.
FIG. 16 is a schematic isometric view of another alternative construction provided with a specially shaped trough for individual seeds or seed tapes.

FIG. 14 illustrates one form of plant growing medium constructed in accordance with the invention and including a fibrous board 93 having a density of less than 4.5, and preferably less than 3.0, pcf, and provided with rows of equally spaced, upwardly facing blind holes 93a for receiving individual seeds, nutrients, and filler. The board is also provided with lengthwise slits 93b and widthwise slits 93c extending upwardly from a bottom surface most, but not all, of the way to a top surface of the board, for easy later separation of the board into separate root supporting blocks or cubes for seedlings grown from the seeds. Preferably the slits 93b and 93c match a cross grid in a tray of a conventional automatic planting machine, although transplanting can also be done manually into the ground or into flower pots. As an example, the blocks may be one inch square and one to two inches high.

Figure 15:
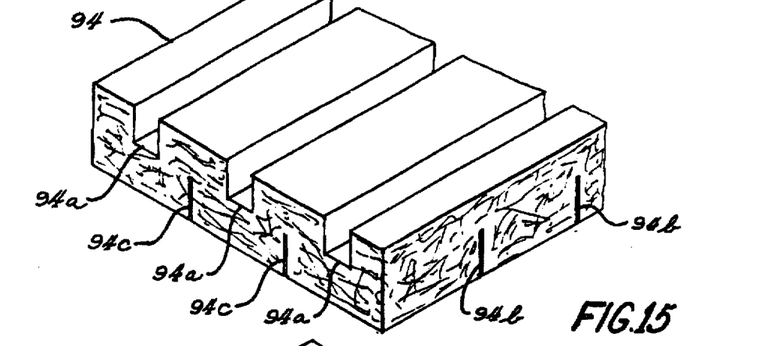
FIG. 15 is a schematic isometric view of an alternative construction provided with troughs for receiving seeds or seed tapes.

FIG. 15 illustrates an alternative plant growing medium including a fiberous board 94 provided with parallel grooves 94a in a top surface for the reception of seed strip containing individual seeds spaced at predetermined intervals. The board 94 is also provided with slits 94b and 94c similar to the slits 93b and 93c of the board 93.

FIG. 16 illustrates still another form of plant growing medium including a fiberous board 95 having an irregular top profile including grooves 95a and inclined planes 95b. The board 95 has slits 95c and 95d similar to the slits 93b and 93c of the board 93. The grooves 95a are offset from midway between lengthwise slits 95c or between a slit 95c and an edge of the board. The inclined planes 95b facilitate getting seeds into the grooves 95a, and the offset of the grooves locates the eventual seedlings out of the way of a "pusher" of a particular conventional automatic planting machine wherein the pusher pushes in the area of the inclined plane 95b of a particular growing block.

The boards 93, 94, and 95 are preferably black or dark gray in color and are preferably made of glass wool fibers in accordance with the invention, i.e., with a three-dimensional orientation of fibers and binder binding the fibers to each other at substantially every place of fiber-to-fiber contact. The fiber diameter should be about 16 to 75 HT (hundred thousandths of an inch), and preferably 30 to 40 HT. The binder may be thermosetting or thermoplastic and may be biodegradable. Binder content should be 5 to 20% LOI, preferably about 8 to 15%. Root supporting blocks or cubes with such a fibrous structure are not subject to delamination upon handling. One of the biggest advantages of this feature is scheduling. For example, an owner of an automatic planting machine may be hired by different growers to plant seedlings of the same or different crops at different times scheduled in advance. Before our invention, growers with seedlings raised in rock wool or slag wool blocks or in loose matrices such as vermiculite, peat moss, soil, etc. had to estimate when the seedlings would be ready for transplanting. The criterion was when the seedlings would have produced enough roots in the rock wool or other planting blocks to hold the blocks together sufficiently during handling, transportation, and planting. In fact, the directions for potting plants grown from seed in rock wool blocks specify, "Potting should not take place until plenty of roots are showing at the bottom of the block." If a grower scheduled planting and then found that his seedlings weren't ready when the scheduled planting time arrived, because of insufficient roots, every grower's schedule was thrown off. With the growing blocks of our invention, the time of transplanting from the greenhouse to the field is less critical, because the roots of each seedling need not hold the respective growing block together. Other advantages of our growing blocks, or boards of connected growing blocks, are greater ease of handling and transportation without root damage or spillage of nutrients.

Numerous variations may be made in the plant growing media. Following is a partial summary.

Fertilizer, nutrients, perlite, vermiculite, manure, peat moss, wood chips, sawdust, soil, and moisture holding additives in various combinations may be blened with the fibers in the hydropulper 20 for incorporation into the boards such as the board 93, which need not necessarily have the holes 93a.

For hydroponic gardening, organic microspheres such as polystyrene or polyethylene hollow beads, or inorganic microspheres such as glass or clay hollow beads, or wood chips may be blended with the fibers in the hydropulper 20 for incorporation into the resultant boards, to enable the boards to float.

Grass seeds, flower seeds, vegetable seeds, or tree seeds may be blended with the fibers in the hydropulper 20 for incorporation into the resultant boards. Growth can then be initially in a greenhouse, for easy transplanting later.

The lofted fiber plant growing boards may be made black for better absorption of heat from the sun in a greenhouse. The glass fibers may be black, or carbon or graphite may be added to the binder. Alternatively, black organic dyes may be added.

The fibers in a lofted-fiber, plant growing board may be a blend of fine fibers, e.g. 16 to 30 HT, and coarse fibers, e.g. 35 to 75 HT (HT=hundred thousandths of an inch in diameter). The fibers may be all glass fibers, partly glass fibers with mineral wool fibers, or synthetic or natural organic fibers optionally blended with glass fibers. Organic nutrients blended with the fibers in the hydropulper 20 may be dry powder or pebbles, preferably treated so as to provide slow or timed release.

A lofted-fiber plant growing board may be made in two layers or major surfaces, one dark colored for facing the sun in winter and one surface being light colored for facing the sun in summer.

A lofted-fiber plant growing board may contain, as additives or as part of the binder, the three basic growth nutrients, namely potassium (as $K_2O$), nitrogen, and phosphorus (as $P_2O_5$).

Various other modifications may be made in the structure shown and described without departing from the spirit and scope of the invention.

We claim:

1. For use in hydroponic gardening as a plant growing medium, a fabricated fibrous product having a density of less than 4.5 pcf comprising a pack of fibers, the fibers having a three-dimensional orientation and at least some of the fibers being glass fibers, hollow microspheres distributed within and substantially throughout the pack, and binder binding the fibers to each other at substantially every place of fiber-to-fiber contact.

* * * * *